United States Patent [19]

Emoto et al.

[11] Patent Number: 4,683,559
[45] Date of Patent: Jul. 28, 1987

[54] OPTICAL PICKUP WITH A TWO-DETECTOR ARRANGEMENT

[75] Inventors: Masami Emoto; Hiroshi Gotoh; Hideo Inuzuka, all of Yokohama, Japan

[73] Assignee: Ricoh Company, Ltd., Tokyo, Japan

[21] Appl. No.: 602,189

[22] Filed: Apr. 19, 1984

[30] Foreign Application Priority Data

Apr. 20, 1983 [JP] Japan .................................. 58-68445
Aug. 10, 1983 [JP] Japan ................................ 58-144870
Sep. 20, 1983 [JP] Japan ................................ 58-172087

[51] Int. Cl.$^4$ ............................................. G11B 7/00
[52] U.S. Cl. ...................................... 369/44; 369/45; 369/46
[58] Field of Search ....................... 250/201 DF, 204; 358/342; 369/43, 44, 45, 46

[56] References Cited

U.S. PATENT DOCUMENTS 4,414,658 11/1983 Yoshida ................................. 369/46

Primary Examiner—Robert L. Richardson
Attorney, Agent, or Firm—Cooper, Dunham, Griffin & Moran

[57] ABSTRACT

An optical pickup for detecting a distance to an optical disk on which information is optically stored includes a tracking error detecting device for detecting a tracking error by receiving a part of the light reflected from the disk and a focusing error detecting device for detecting the remaining part of the light reflected from the disk, structured such that the tracking error detecting device receives 60% or more of the reflected light.

10 Claims, 13 Drawing Figures (A = B)

(A < B)

(A > B)

(C = D)

(C > D)

AMOUNT OF RECEIVED LIGHT
FOR TRACKING ERROR DETECTION

OPTICAL PICKUP WITH A TWO-DETECTOR ARRANGEMENT

BACKGROUND OF THE INVENTION

1. Field of the Invention

This invention generally relates to an optical information processing device and particularly to an optical pickup which receives a light beam reflected from a recording medium to control its position with respect to the recording medium. More specifically, the present invention relates to an optical pickup for carrying out tracking and focusing at high accuracy.

2. Description of the Prior Art

An optical pickup for optically reading information stored in an optical disk is well known. Such an optical pickup is normally structured to carry out tracking and focusing controls so as to have a light beam properly follow and stay focused on a track along which information is recorded. For this purpose, the optical pickup receives a light beam reflected from the optical disk to produce a position control signal, which is used to control the position of the optical pickup with respect to the optical disk. One of the methods for detecting the position of the optical pickup with respect to the disk is the knife-edge method.

FIGS. 1a and 1b show the overall structure of the typical prior art optical pickup system for detecting tracking and focusing conditions on the basis of the knife-edge method. As shown, a light beam emitted from a light source 1, such as a semiconductor laser, is collimated (parallel) by a coupling lens 2 and the thus collimated beam is reflected by a polarizing beam splitter 3 to pass through a ¼ wave length plate 4. The light beam is then focused by an objective lens 5 onto the surface of a disk 6 thereby forming a spot having the diameter of approximately 1.6 microns.

A reflected light beam from the surface of the disk 6 passes through the objective lens 5 to be also converted into a collimated light beam which is then converted into a linearly polarized light beam whose plane of polarization is perpendicular to that of the incident light beam by the ¼ wave length plate 4. Thereafter, the light beam passes through the beam splitter 3 and is made convergent by a lens 7. As shown in FIG. 1b, a half of this convergent light beam 10 is incident on a tracking error detecting device 8 which is comprised of a pair of light receiving elements C and D arranged on both sides with respect to the direction of track T, and the remaining half of the beam 10 is incident on a focus error detecting device 9 comprised of a pair of light receiving elements A and B arranged on both sides of a knife edge defined by the tracking error detecting device 8.

The principle of focusing error detecting operation of the optical pickup shown in FIG. 1a will be described with reference to FIGS. 2a through 2c. The top end of the tracking error detecting device 8 serves as a knife edge, and, under the in-focus condition as shown in FIG. 2a, outputs from the respective light receiving elements A and B are equal. However, when the disk 6 moves away from the objective lens 5 as shown in FIG. 2b, the output from the element A becomes smaller than the output from the element B; on the other hand, when the disk 6 moves closer to the objective lens 5 as shown in FIG. 2c, the output from the element A becomes larger than the output from the element B. In this manner, the focus error condition may be detected by comparing the outputs from both of the elements A and B.

Regarding the tracking error detecting operation, when the spot is formed in registry with a track as shown in FIG. 3a, outputs from the respective elements C and D are equal. However, as shown in FIG. 3b when the spot is shifted from a track, outputs from the respective elements C and D become unequal. That is, one of the outputs become larger than the other depending upon the direction of shift with respect to the track.

In such a prior art optical pickup, accuracies required for focusing error detection and for tracking error detection are 1 and 0.1 micron, respectively. In the prior art knife edge method, the tracking error detecting device receives approximately 50% of the light beam and the error in this signal is approximately 0.05 microns, which is approximately half of the required accuracy of 0.1 micron. This indicates that higher accuracies are required for other parts of the optical system, which tends to push up the cost.

SUMMARY OF THE INVENTION

It is therefore a primary object of the present invention to provide an improved optical pickup.

Another object of the present invention is to provide an optical pickup capable of detecting a tracking error at high accuracy.

A further object of the present invention is to provide an optical pickup capable of detecting a tracking error and a focusing error optimally.

Other objects, advantages and novel features of the present invention will become apparent from the following detailed description of the invention when considered in conjunction with the accompanying drawings.

BRIEF DESCRIPTION OF THE DRAWINGS

FIG. 1b is a schematic illustration showing the arrangement of the two light receiving elements C and D in the tracking error detecting device 8 in the optical pickup of FIG. 1a;

FIGS. 2a–2c are schematic illustrations useful for explaining the focusing error detecting operation of the optical pickup shown in FIG. 1a;

FIGS. 3a and 3b are schematic illustrations useful for explaining the tracking error detecting operation of the optical pickup shown in FIG. 1a;

DESCRIPTION OF THE PREFERRED EMBODIMENTS

Figure 1A:
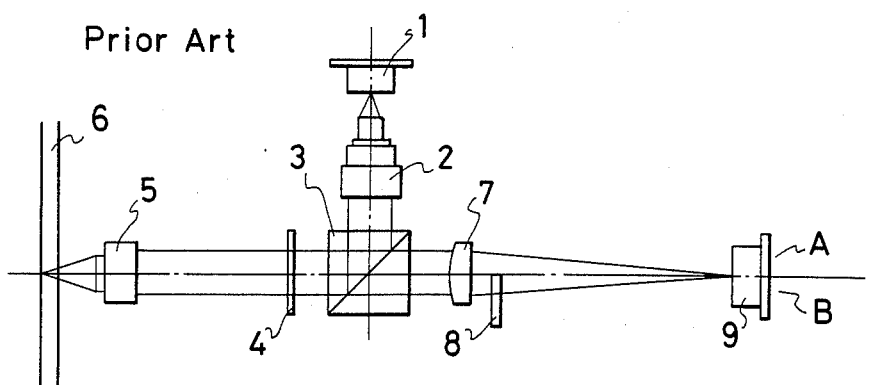
FIG. 1a is a schematic illustration showing a typical prior art optical pickup for detecting tracking and focusing errors on the basis of the knife edge method.
Figure 1B:
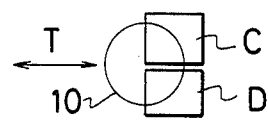
Figure 2A:
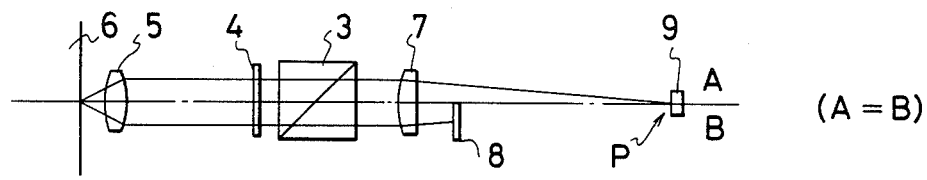
Figure 2B:
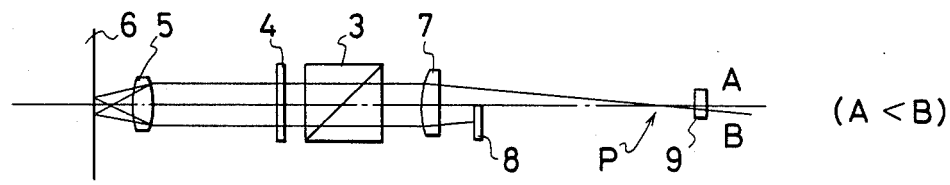
Figure 2C:
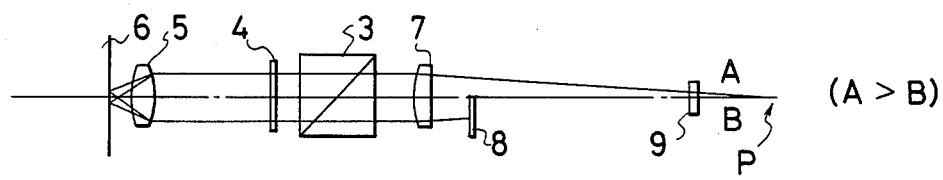
Figure 3A:
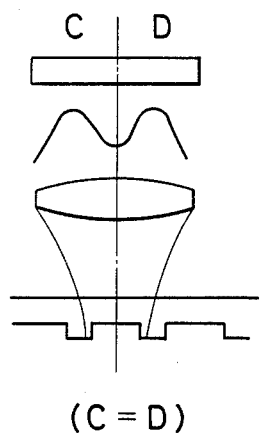
Figure 3B:
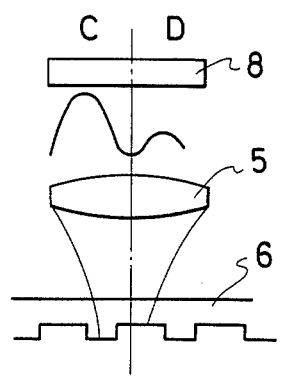
Figure 4:
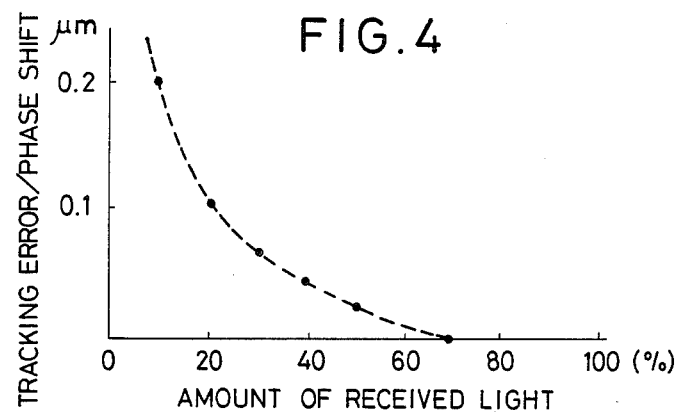
FIG. 4 is a graph showing the relation between the % amount of light beam received by the tracking error detecting device 8 and the level of tracking error or phase shift.

Referring now to FIG. 4, there is graphically shown a measured result indicating how the level of error in tracking signal varies depending on how much the tracking error detecting device 8 receives of the light from the light beam 10. In the graph of FIG. 4, the abscissa is taken for the ratio of the area of the light beam 10 intersected by the tracking error detecting device 8 to the cross-sectional area of the light beam 10 (or % amount of light received by the tracking error detecting device 8) and the ordinate is taken for the tracking accuracy or the level of error in tracking signal. As shown in FIG. 4, with the % amount of received light at 50, the error level in tracking signal is approximately 0.05 microns. The tracking error level decreases rapidly as the % amount of received light increases and the error level becomes as small as can be neglected when the % amount of received light reaches 60% or more.

Figure 5A:
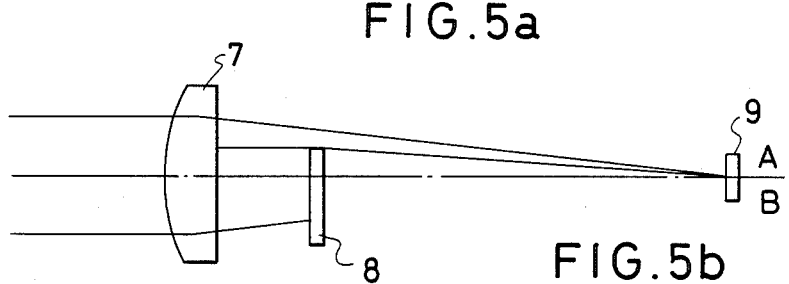
FIG. 5a is a schematic illustration showing an optical pickup constructed in accordance with one embodiment of the present invention.
Figure 5B:
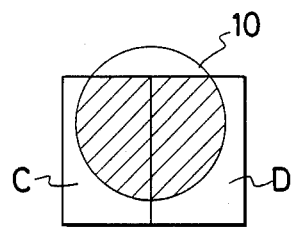
FIG. 5b is a schematic illustration showing the relation between the light beam 10 and the paired light receiving elements C and D of the tracking error detecting device 8.

FIGS. 5a and 5b schematically show the structure of one embodiment of the present invention. As shown, the illustrated optical pickup is structurally similar in many respects to that described above, and thus FIGS. 5a and 5b only show the main portion of the present invention. In the present invention, the tracking error detecting device 8 is arranged to extend beyond the optical axis of the lens 7. In the preferred embodiment, the tracking error detecting device 8 is arranged to intersect the light beam 10 such that the % amount of intersected area is 60% or more. That is, as shown in FIG. 5b, the tracking error detecting device 8 is comprised of the pair of light receiving elements C and D which are arranged side by side horizontally with the vertical boundary line aligned perpendicular to the optical axis of the lens 7 and thus in parallel with a track on the disk 6 so as to receive 60% or more of the light of the light beam 10. Thus, the occurrence of tracking error may be detected when the light beam 10 moves sideways with respect to the vertical boundary line or partition line between the pair of light receiving elements C and D.

Figure 6:
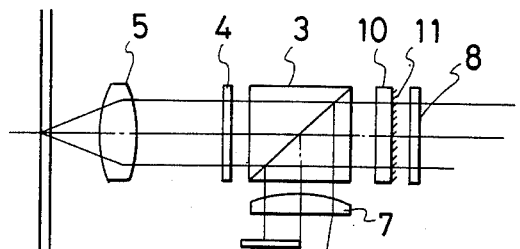
FIGS. 6 and 7 are schematic illustrations showing other embodiments of the present invention.

FIG. 6 shows another embodiment of the present invention in which the tracking error detecting device 8 and the focusing error detecting device 9 are disposed in different optical paths. That is, the tracking error detecting device 8 is disposed in a first optical path which extends straight through the beam splitter 3 from the optical path of lens 5 and the focusing error detecting device 9 is disposed in a second optical path which extends as bent over 90° by the beam splitter 3. In the first optical path is disposed a ¼ wave length plate 10 having its surface opposite to the tracking error detecting device 8 is structured in the form of a half mirror 11. Thus, the tracking error detecting device 8 receives all of the light passing through the plate 10 in the first optical path. In the second optical path is disposed the convergent lens 7 and a knife edge element 13 which cuts half of the light passing through the lens 7 to be applied to the focusing error detecting device 9 because the knife edge of element 13 is arranged at the optical axis of lens 7 and thus at the partition line between the paired light receiving elements A and B.

It is to be noted that various modifications may be made from the structure of FIG. 6. For example, the convergent lens 7 may be disposed in the first optical path as interposed between the beam splitter 3 and the ¼ wave length plate 10. Moreover, the elements in the first optical path and the elements in the second optical path may be interchanged.

In order to obtain an information signal from the light beam reflected from the disk 6, use may be made of a sum of output signals from the focusing error detecting light receiving elements A and B, which will be simply indicated as A+B, a sum of output signals from the tracking error detecting light receiving elements C and D, which will be simply indicated as C+D, or a sum of all of the light receiving elements A, B, C and D, which will be simply indicated as A+B+C+D.

FIG. 4 also shows the relation between the % amount of light received by the tracking error detecting device 8 and the phase shift of information signal. As shown, it has been found that if the % amount of light received by the tracking error detecting device 8 is 50% or less, an appreciable phase shift of information signal is produced thereby adversely affecting the accuracy of reading out the stored information. As described previously, in the prior art optical pickup employing the knife edge method, the amount of light received by A+B is 50% and equal to the amount of light received by C+D. Thus, this indicates the presence of an appreciable phase shift in the resultant information signal. If it is desired to obtain an information signal from A+B+C+D, since different elements are required to be used in the tracking and focusing devices 8 and 9, there will be produced an error in the resultant information signal due to nonuniformity in sensitivity.

Under the circumstances, in accordance with this aspect of the present invention, since the tracking error detecting device 8 is disposed to intersect 60% or more of the light beam 10, it is structured to obtain an information signal from the paired light receiving elements C and D of the tracking error detecting device 8. With this structure, an information signal free of phase shift can be obtained. Thus, this embodiment structurally corresponds to that illustrated in FIGS. 5a and 5b. In the present embodiment, however, output signals from the tracking error detecting light receiving elements C and D are used not only for obtaining a tracking error signal but also for obtaining an information signal. In other words, an information signal is obtained by C+D and tracking error and focusing error signals are obtained by C−D and A−B, respectively.

Figure 7:
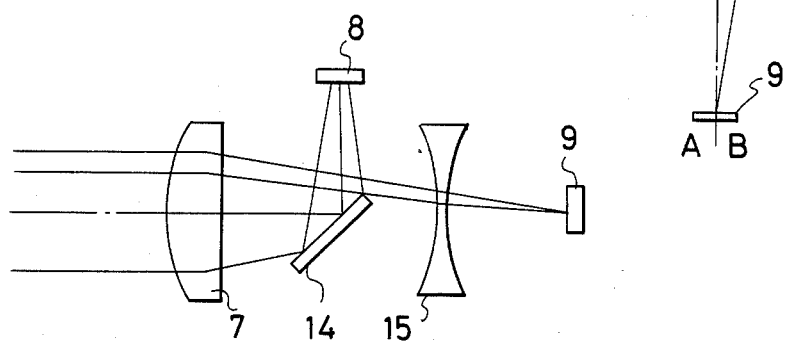

FIG. 7 shows another embodiment of the present invention in which the tracking error detecting device 8 is disposed out of the optical path of lens 7. In this embodiment, the tracking error detecting device 8 does not serve as a knife edge, and, instead, a reflecting mirror 14 is provided in the optical path of lens 7, interposed between the lens 7 and a convex lens 15. Thus, the light beam from the lens 7 is partly reflected by the mirror 14 toward the tracking error detecting device 8 disposed above and the remaining light beam is allowed to impinge upon the focusing error detecting device 9. In this case, the top edge of mirror 14, in effect, serves as a knife edge.

A further aspect of the present invention will be described with particular reference to FIG. 8. In accordance with this aspect of the present invention, it is so structured that the tracking error detecting device 8 receives 60-90% of the light beam 10 from the disk 6 and the focusing error detecting device 9 receives the remaining or 40-10% of the light beam 10.

As described previously, in the optical pickup of the above-described type, the accuracy required for tracking error detection is approximately ±0.1 microns and the accuracy required for focusing error detection is approximately ±1 micron. Thus, the accuracy required for tracking error detection is higher by an order of magnitude. As graphically shown in FIG. 8, according to the study of the present inventors, it has been found that as the amount of light received by the tracking error detecting device 8 is increased, the level of tracking signal increases and thus the detection accuracy increases; on the other hand, if the amount of received light is decreased, the signal level decreases and thus the detection accuracy becomes deteriorated.

Figure 8:
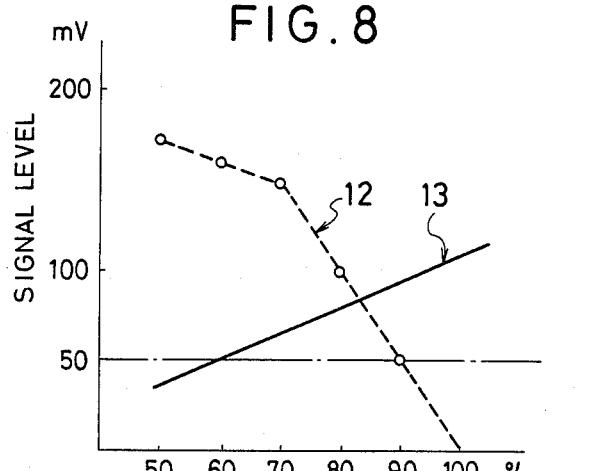
FIG. 8 is a graph useful for explaining a further embodiment of the present invention.

In the graph of FIG. 8, the abscissa is taken for the percentage of the amount of light received by the tracking error detecting device 8 out of the total amount of light of the light beam 10 from the disk 6 and the ordinate is taken for the level of signal obtained from the tracking error detecting device 8 or focusing error detecting device 9. As shown by the solid line 13 in the graph of FIG. 8, as the amount of light received by the tracking error detecting device 8, which requires the detection accuracy of ±0.1 microns, increases, the signal level increases approximately linearly, indicating that the detection accuracy may be maintained at a high level. On the other hand, if the amount of light received by the tracking error detecting device 8 is increased, the amount of light received by the focusing error detecting device 9 decreases, and, thus, as indicated by the dotted line 12 in the graph of FIG. 8, the signal level for focusing error detection decreases thereby becoming increasingly difficult to maintain the required detection accuracy.

In the optical pickup of the above-described type, there is typically a noise having the level in the order of 10 mV, and, thus, there must be provided a noise margin of at least 50 mV, which is indicated in the graph of FIG. 8 by the one-dotted line. As is obvious from these considerations, in order to carry out a position control operation, including tracking and focusing, stably as well as reliably while maintaining the tracking error detection accuracy at ±0.1 microns and the focusing error detection accuracy at ±1 micron, it is important that both of the tracking error signal 13a and the focusing error signal 12 be larger than the noise margin of 50 mV. In order to satisfy such a requirement, as is apparent from the graph of FIG. 8, the % amount of light of the light beam 10 received by the tracking error detecting device 8 must be set in a range from 60 to 90%, and thus the % amount of light received by the focus error detecting device 9 is set in a range from 40 to 10% correspondingly.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical pickup for detecting the position of a subject in a first direction and a second direction, comprising:
    a light source;
    an optical system for directing a light beam emitted from said light source onto said subject and for collecting a reflected light beam for said subject;
    first detecting means for detecting the position of said subject in a first direction by receiving a first part of said reflected light beam; and
    second detecting means for detecting the position of said subject in a second direction which is different from said first direction by receiving a second part of said reflected light beam, said first part being larger in amount than said second part.

2. The optical pickup of claim 1 wheren said subject is an optical disk on which information is optically stored.

3. The optical pickup of claim 2 wherein said optical disk is provided with a plurality of tracks along which information is optically recorded.

4. The optical pickup of claim 3 wherein said first detecting means includes a tracking error detecting device for detecting a tracking error of said disk.

5. The optical pickup of claim 4 wherein said tracking error detecting device is comprised of a pair of light receiving elements arranged side-by-side, with the partition line therebetween directed in parallel with said tracks.

6. The optical pickup of claim 4 wherein said second detecting means includes a focusing error detecting device for detecting a focusing error of said disk.

7. The optical pickup of claim 6 wherein said focusing error detecting device is comprised of a pair of light receiving elements arranged side-by-side, with the partition line therebetween directed perpendicular to said partition line of said tracking error detecting device.

8. The optical pickup of claim 6 wherein said tracking error detecting device receives 60% or more of said reflected light beam and said focusing error detecting device receives the remaining % of said reflected light beam.

9. The optical pickup of claim 6 wherein said tracking error detecting device receives 60-90% of said reflected light beam and said focusing error detecting device correspondingly receives 40-10% of said reflected light beam.

10. The optical pickup of claim 2 including means for producing a signal indicating the information stored in said disk from said first detecting means.

* * * * *